United States Patent
Stojkovic et al.

(10) Patent No.: US 11,225,183 B2
(45) Date of Patent: Jan. 18, 2022

(54) DUAL-PURPOSE GRAB HANDLE AND TIE-DOWN BRACKET FOR MOTOR VEHICLE

(71) Applicant: Ford Global Technologies, LLC, Dearborn, MI (US)

(72) Inventors: Dragan B. Stojkovic, Taylor, MI (US); Joshua Jacob Clement, Dearborn, MI (US); John Comiez, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 175 days.

(21) Appl. No.: 16/699,782

(22) Filed: Dec. 2, 2019

(65) Prior Publication Data

US 2021/0162906 A1 Jun. 3, 2021

(51) Int. Cl.
*B60P 7/08* (2006.01)
*B60N 3/02* (2006.01)

(52) U.S. Cl.
CPC ............ *B60N 3/026* (2013.01); *B60P 7/0807* (2013.01)

(58) Field of Classification Search
CPC .......... B60N 3/026; B60N 3/023; B60N 3/02; B60N 2/78; B60N 2/24; B60N 2/4235; B60N 2/42709; B60N 2/02; B60N 2/245; B60N 2002/905

USPC ......... 296/1.02, 214, 146.7, 1.08, 62, 146.1, 296/152, 153, 187.05, 71, 64; 16/110.1, 16/412, 429, 438, 422, 445, 441

See application file for complete search history.

(56) References Cited

U.S. PATENT DOCUMENTS

| | | | |
|---|---|---|---|
| 4,270,478 A * | 6/1981 | Kafka | F16G 11/046 114/218 |
| 6,416,265 B1 | 7/2002 | Flores et al. | |
| 6,588,355 B1 * | 7/2003 | Whitley, II | B63B 21/045 114/218 |
| 7,131,387 B1 * | 11/2006 | Czipri | B63B 21/045 114/218 |
| 8,393,657 B1 | 3/2013 | Duderstadt | |
| 9,022,445 B1 | 5/2015 | Duderstadt | |
| 10,286,830 B2 * | 5/2019 | Fortin | B60P 7/0807 |
| 2007/0267884 A1 | 11/2007 | Failla et al. | |
| 2016/0326782 A1 * | 11/2016 | Muiter | B60R 3/00 |
| 2019/0105971 A1 * | 4/2019 | Singer | B60J 7/041 |

* cited by examiner

*Primary Examiner* — D Glenn Dayoan
*Assistant Examiner* — Sunsurraye Westbrook
(74) *Attorney, Agent, or Firm* — David Coppiellie; Carlson, Gaskey & Olds, P.C.

(57) ABSTRACT

This disclosure relates to a dual-purpose grab handle and tie-down bracket for a motor vehicle. An example vehicle includes a body panel defining at least a portion of a recess, and a component mounted at least partially in the recess. Further, the component provides a tie-down bracket configured to attach to a tie-down and a grab handle configured to be grasped by a hand of a user.

20 Claims, 4 Drawing Sheets

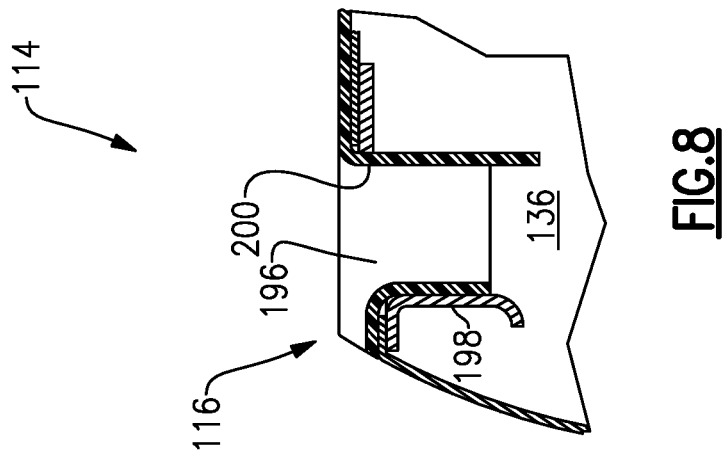
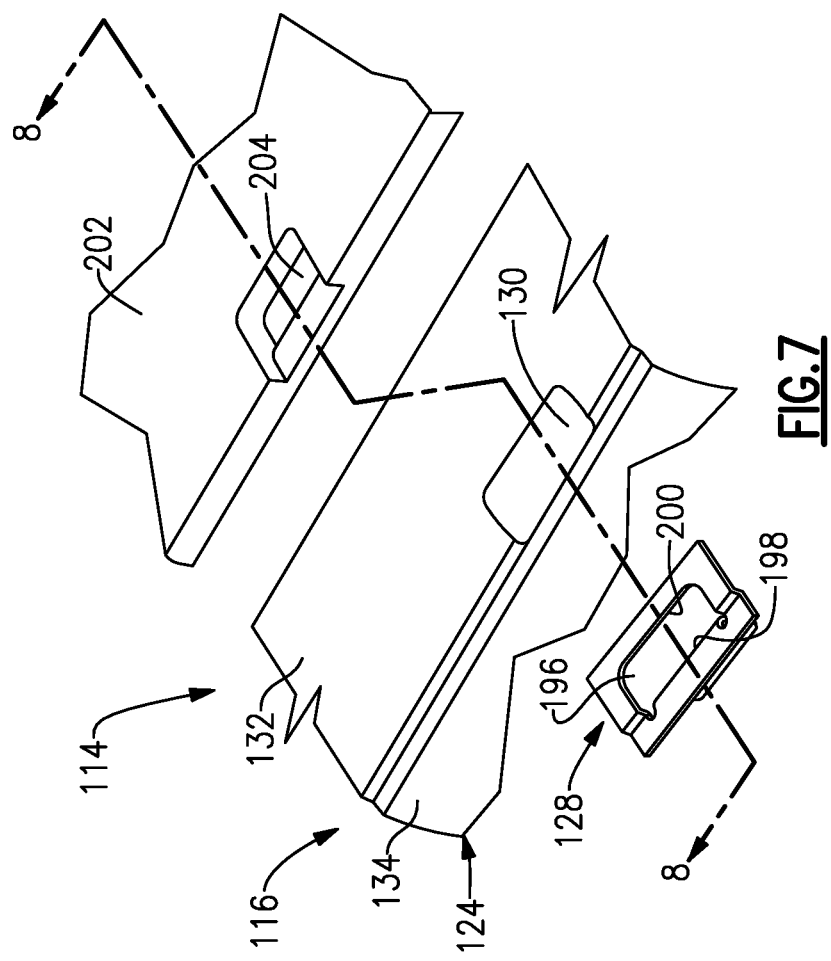

DUAL-PURPOSE GRAB HANDLE AND TIE-DOWN BRACKET FOR MOTOR VEHICLE

TECHNICAL FIELD

This disclosure relates to a dual-purpose grab handle and tie-down bracket for a motor vehicle.

BACKGROUND

Users often transport cargo on a cargo bed ("bed") in a box of a pickup truck and secure that cargo using tie-downs such as straps. Users also often load or unload the cargo from the side of the box as opposed to using a tailgate.

SUMMARY

A motor vehicle according to an exemplary aspect of the present disclosure includes, among other things, a body panel defining at least a portion of a recess, and a component mounted at least partially in the recess. The component provides a tie-down bracket configured to attach to a tie-down and a grab handle configured to be grasped by a hand of a user.

In a further non-limiting embodiment of the foregoing motor vehicle, the component includes a bar.

In a further non-limiting embodiment of any of the foregoing motor vehicles, the bar includes a first vertical leg, a second vertical leg, and a U-shaped section extending between the first and second vertical legs.

In a further non-limiting embodiment of any of the foregoing motor vehicles, an upper surface of the U-shaped section lies beneath a plane defined by an upper wall of the body panel.

In a further non-limiting embodiment of any of the foregoing motor vehicles, the U-shaped section includes first and second lateral legs and a longitudinal leg, the first and second lateral legs extend in a direction normal to the first and second vertical legs, and the longitudinal leg extends between the first and second lateral legs in a direction normal to the first and second lateral legs.

In a further non-limiting embodiment of any of the foregoing motor vehicles, the first and second lateral legs are connected to respective first and second vertical legs via first and second bends in the bar, the longitudinal leg is connected to the first and second lateral legs by respective third and fourth bends in the bar.

In a further non-limiting embodiment of any of the foregoing motor vehicles, the body panel is an outer body panel of a box of the motor vehicle, and the box further comprises an inner body panel defining a portion of the recess.

In a further non-limiting embodiment of any of the foregoing motor vehicles, the vehicle includes first and second vertical brackets connecting respective first and second vertical legs to the inner body panel, and first and second lateral brackets connecting respective first and second lateral legs to the outer body panel.

In a further non-limiting embodiment of any of the foregoing motor vehicles, the first and second vertical brackets are welded to a respective one of the first and second vertical legs and are riveted to the inner body panel, and the first and second lateral brackets are welded to a respective one of the first and second lateral legs and are bolted to the outer body panel.

In a further non-limiting embodiment of any of the foregoing motor vehicles, the first and second vertical brackets are welded at least to a laterally outer surface of the respective one of the first and second vertical legs, and the first and second lateral brackets are welded at least to a lower surface of the respective one of the first and second lateral legs.

In a further non-limiting embodiment of any of the foregoing motor vehicles, the first and second vertical brackets each include a channel, first and second panel-attachment walls on opposite sides of the channel and configured to directly contact the inner body panel, a channel base lying in a plane parallel to the first and second panel-attachment walls and defining a portion of the channel, and first and second channel side walls connecting the first and second panel-attachment walls to the channel base and defining opposite sides of the channel.

In a further non-limiting embodiment of any of the foregoing motor vehicles, the first and second lateral brackets each include a panel-attachment wall configured to directly contact the outer body panel, a first leg-attachment wall lying in a plane substantially parallel to the panel-attachment wall, and a second leg-attachment wall extending between the first leg-attachment wall and the panel-attachment wall.

In a further non-limiting embodiment of any of the foregoing motor vehicles, the body panel includes a cutout leading into the recess.

In a further non-limiting embodiment of any of the foregoing motor vehicles, the component is a reinforcement plate and includes an opening between a first lateral surface and a second lateral surface on opposite sides of the opening, the first lateral surface is configured as a grab handle, and the second lateral surface is configured to attach to a tie-down.

In a further non-limiting embodiment of any of the foregoing motor vehicles, the vehicle includes a trim piece arranged over the component, and the trim piece includes an opening providing access to the component.

In a further non-limiting embodiment of any of the foregoing motor vehicles, the body panel is a panel of a box the motor vehicle, and the component is one of a plurality of substantially similar components such that one or more tie-downs can be attached to the plurality of components to hold cargo.

In a further non-limiting embodiment of any of the foregoing motor vehicles, the motor vehicle is a pickup truck and the box includes a cargo bed.

A motor vehicle assembly according to an exemplary aspect of the present disclosure includes a body panel defining at least a portion of a recess, a bar mounted at least partially in the recess. The bar provides a tie-down bracket configured to attach to a tie-down and a grab handle configured to be grasped by a hand of a user. Further, the bar includes a first vertical leg, a second vertical leg, and a U-shaped section including a first lateral leg, a second lateral leg, and a longitudinal section extending between the first and second lateral legs.

In a further non-limiting embodiment of the foregoing assembly, the body panel is an outer body panel of a box of the motor vehicle, an inner body panel of the box defines a portion of the recess, a first set of brackets connects the first and second vertical legs to the inner body panel, and a second set of brackets connects the first and second lateral legs to the outer body panel.

In a further non-limiting embodiment of any of the foregoing assemblies, the body panel includes a plurality of recesses and a plurality of bars, each of the plurality of bars arranged in a respective one of the plurality of recesses, and each of the bars is configured as a tie-down bracket and a grab handle.

BRIEF DESCRIPTION OF THE DRAWINGS

FIG. 7 is an exploded view of another example dual-purpose component relative to parts of the box of the motor vehicle.

FIG. 8 is a cross-sectional view taken along line 8-8 from FIG. 7.

DETAILED DESCRIPTION

This disclosure relates to a dual-purpose grab handle and tie-down bracket for a motor vehicle. An example vehicle includes a body panel defining at least a portion of a recess, and a component mounted at least partially in the recess. Further, the component provides a tie-down bracket configured to attach to a tie-down and a grab handle configured to be grasped by a hand of a user. The dual-purpose component is low cost, sturdy, and ergonomic. These and other benefits will be appreciated from the below description.

Figure 1:
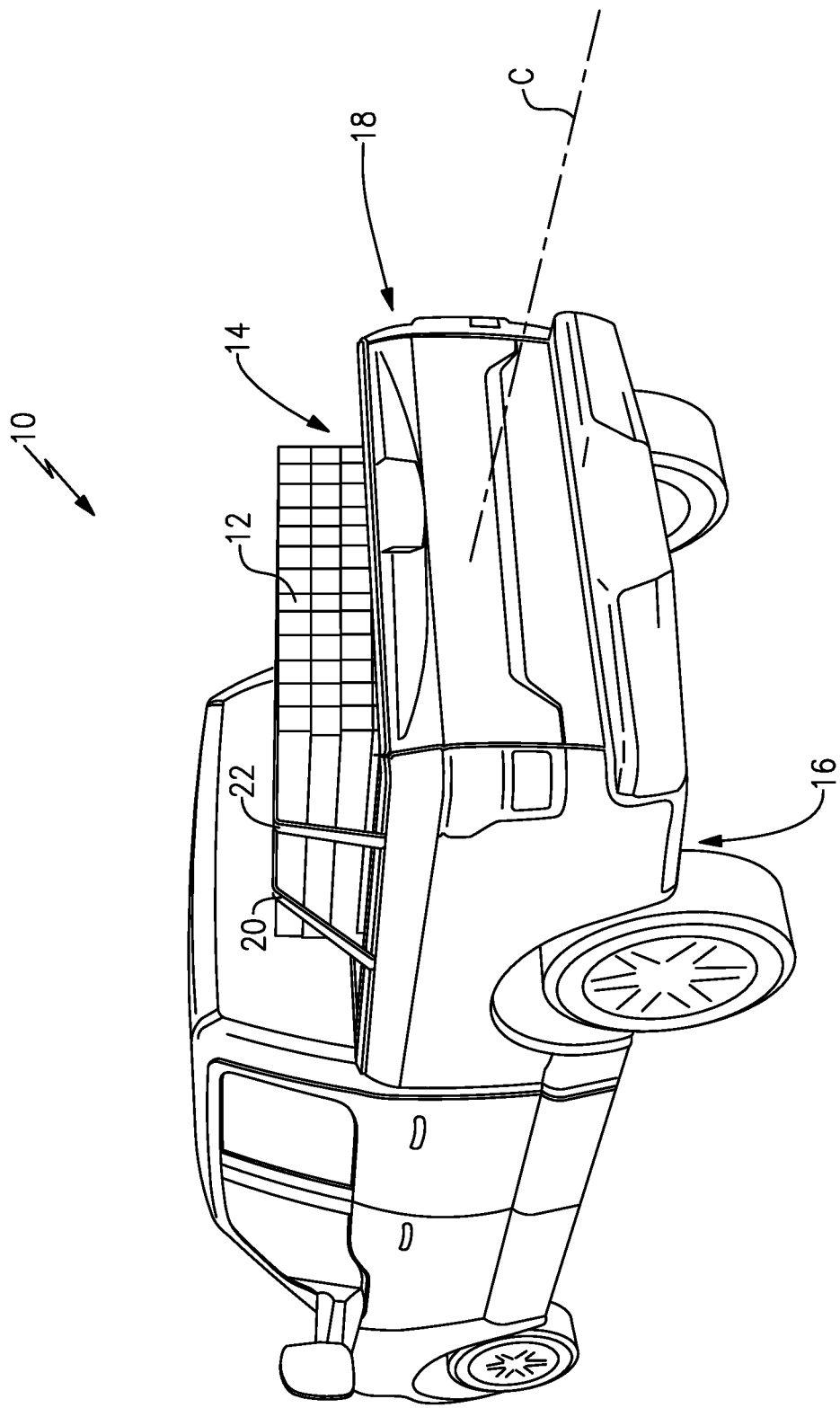
FIG. 1 is a rear-perspective view of a motor vehicle with cargo secured to a cargo bed.

Referring to the drawings, FIG. 1 is a rear-perspective view of a motor vehicle 10 ("vehicle 10"). The vehicle 10 is a pickup truck in FIG. 1, but it should be understood that this disclosure extends to other types of vehicles, such as other types of trucks and sport utility vehicles (SUVs). In FIG. 1, cargo 12, which in this example is a load of wood, is arranged in a truck box 14, which includes a cargo bed (not visible in FIG. 1) upon which the cargo 12 is supported and first and second sidewalls 16, 18 that extend along opposite sides of the vehicle 10. In particular, the first and second sidewalls 16, 18 have a length dimension extending substantially parallel to a centerline C of the vehicle 10.

In FIG. 1, the cargo 12 is secured in the truck box 14 using tie-downs, such as ropes, cables, straps, cords, etc. In this example, there are two tie-downs 20, 22 holding the cargo 12 in place. The tie-downs 20, 22 are each connected to two dual-purpose components, which provide both a tie-down bracket and a grab handle. An example dual-purpose component will now be described. The vehicle 10 may include one or more dual-purpose components and associated assemblies (including cutouts, recesses, brackets, fasteners, etc.). In the example of FIG. 1, the vehicle 10 includes at least four dual-purpose components. While only one of the dual-purpose components is described below, the dual-purpose component described below is representative of the other dual-purpose components.

Figure 2:
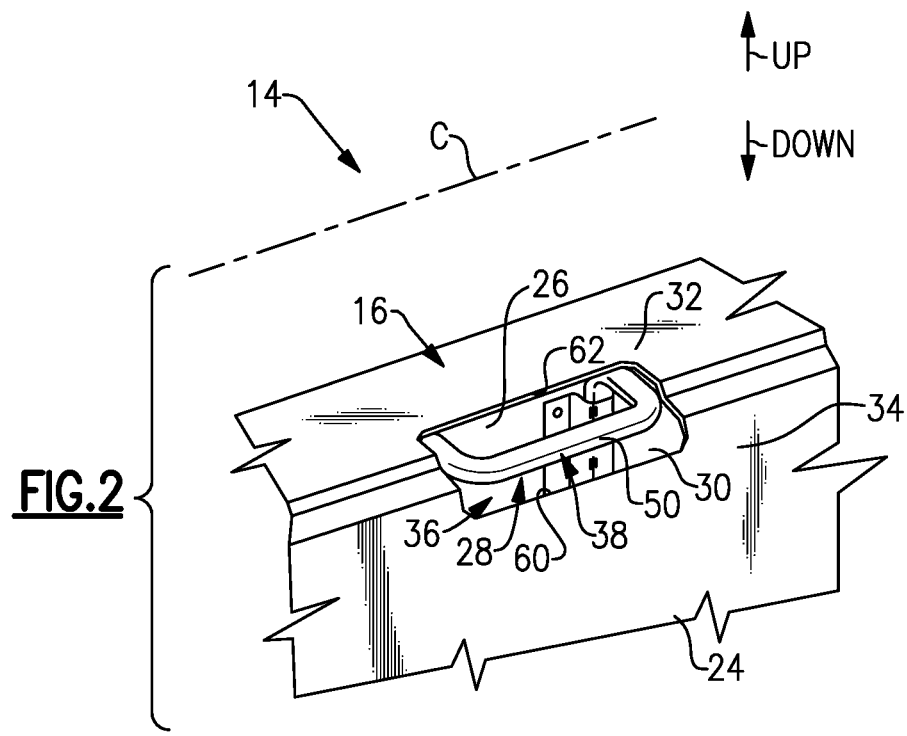
FIG. 2 is a top-perspective view of a portion of a box of the motor vehicle and illustrates a portion of an example dual-purpose component.
Figure 3:
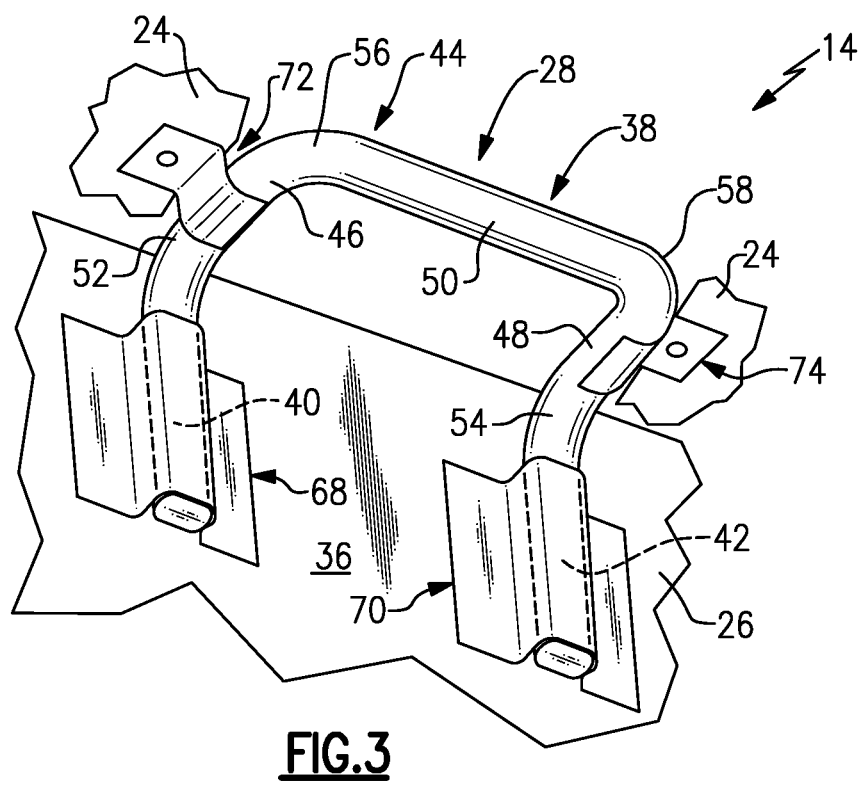
FIG. 3 is a bottom-perspective view of the dual purpose component.

FIG. 2 illustrates a portion of the truck box 14, and in particular illustrates a portion of the first sidewall 16. The first sidewall 16 includes an outer body panel 24 and an inner body panel 26 (FIG. 3). The outer body panel 24 is an outer panel of the vehicle 10 and the inner body panel 26 defines a portion of an interior of the truck box 14. The first sidewall 16 includes an example dual-purpose component 28, which serves as a tie-down bracket and a grab handle. Specifically, the dual-purpose component 28 is configured to attach to tie-downs, including clamps or clasps that are known to be at the end of some types of tie-downs, and is also configured to be grasped by a hand of a user. While the dual-purpose component 28 serves two functions, it should be understood that the dual-purpose component may serve additional functions. In this respect, the term dual-purpose means at least two purposes. Indeed, the dual-purpose component 28 may be referred to as a multi-purpose component.

In this example, the outer body panel 24 includes a cutout 30 in an upper surface 32 and a laterally outer surface 34 thereof. The "up" and "down" directions are labeled in FIG. 2 for ease of reference, and the term "laterally outer" is used with reference to the centerline C and is generally out of the page relative to FIG. 2. The cutout 30 leads to a recess 36, which is a hollow space between the outer body panel 24 and the inner body panel 26. While not shown, one or more pieces of trim may be placed relative to the upper surface 32. In that case, the piece of trim would include an opening, which may be sized and shaped similar to the cutout 30, providing access to the dual-purpose component 28. The one or more pieces of trim can cover any sharp edges, and in one example may also provide a smooth bottom surface beneath the dual-purpose component 28 limiting the user's access to the recess 36.

The dual-purpose component 28, in this example, is a bar 38. The bar 38 is mounted in the recess 36 so as to be readily accessible for use as a tie-down bracket or a grab handle. Further, the bar 38 is mounted in a manner that resists forces pulling the bar 38 toward the centerline C, such as the forces applied by a tie-down, and forces pulling the bar 38 away from the centerline C, such as the force of a user pulling on the bar 38 with their hand.

With reference to FIG. 3, the bar 38 includes a plurality of bends and is formed as a single-piece component. In this example, the bar 38 includes a first vertical leg 40, a second vertical leg 42, and a U-shaped section 44 extending between the first and second vertical legs 40, 42. The length dimensions of the first and second vertical legs 40, 42 are parallel to the up and down directions, in this example. The U-shaped section 44 is U-shaped when viewed from above or below, and lies in a plane normal to the length of the first and second vertical legs 40, 42. Parts of the first and second vertical legs 40, 42 are shown in phantom in FIG. 3 because they are arranged beneath a respective vertical bracket 68, 70 (described below).

The U-shaped section 44 includes first and second lateral legs 46, 48 and a longitudinal leg 50. In this example, the first and second lateral legs 46, 48 have a length dimension extending in a direction normal to the centerline C and normal to the length dimension of the first and second vertical legs 40, 42. The length dimension of the longitudinal leg 50 extends between the first and second lateral legs 46, 48 in a direction parallel to the centerline C and normal to the first and second lateral legs 46, 48.

Again, the bar 38 in this example includes a plurality of bends. Namely, the first and second lateral legs 46, 48 are connected to respective first and second vertical legs 40, 42 via first and second bends 52, 54 in the bar 38. The longitudinal leg 50 is connected to the first and second lateral legs 46, 48 by respective third and fourth bends 56, 58 in the bar 38. The bends 52, 54, 56, 58 are ninety-degree bends in this example. While the bar 38 is a one-piece bar in this example, the bar 38 could be made by a plurality of individual sections which are connected together by welding or another known technique.

The bar 38 is mounted to the box 14 via a plurality of brackets, in this example. The brackets by which the bar 38 is mounted to the box 14 are not tie-down brackets because they are not configured to attach to tie-downs. The bar 38 is mounted so that the longitudinal leg 50 is laterally between a laterally outer edge 60 (FIGS. 2, 4) of the cutout 30 and a laterally inner edge 62 of the cutout 30. Thus, a user's hand has room to grasp the longitudinal leg 50 and a user has room to attach a tie-down to the longitudinal edge 50.

Figure 4:
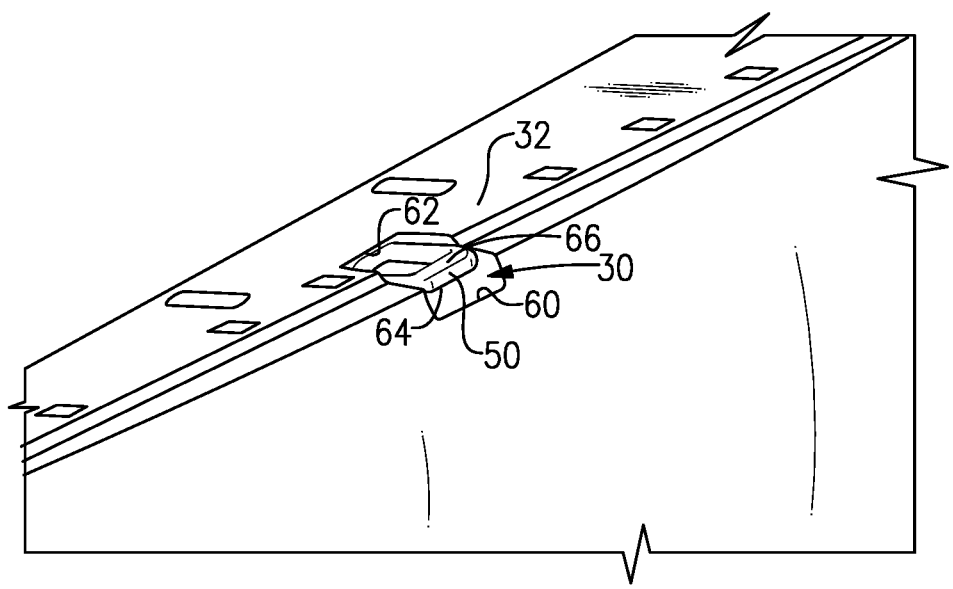
FIG. 4 is a top-perspective view of a portion of the box of the motor vehicle.

As shown in FIG. 4, the longitudinal leg 50 is also vertically between the laterally outer edge 60 and the laterally inner edge 62. In this example, the laterally outer edge 60 is spaced-apart from the laterally inner edge 62 in the down direction (i.e., the laterally outer edge 60 is below the laterally inner edge 62), and a lower surface 64 of the longitudinal leg 50 is above laterally outer edge 60 while an upper surface 66 of the longitudinal leg 50 is beneath the laterally inner edge 62. Thus, in this example, the upper surface 66 lies beneath a plane defined by the upper surface 32. In another example, the upper surface 66 is substantially co-planar with the upper surface 32. The arrangement of the bar 38 provides easy access to the bar, both by tie-downs and the hands of a user, while providing an aesthetically pleasing appearance and also minimizing the likelihood the bar 38 inadvertently catches or snags on adjacent items.

With reference to FIG. 3, in this example the bar 38 is attached to the truck box 14 by first and second vertical brackets 68, 70 connecting respective first and second vertical legs 40, 42 to the inner body panel 26, and first and second lateral brackets 72, 74 connecting respective first and second lateral legs 46, 48 to the outer body panel 24. The terms vertical bracket and lateral bracket in this disclosure do not denote a particular type of bracket, but rather refer to the portion of the bar 38 the brackets contact (i.e., the vertical brackets contact the vertical legs and the lateral brackets contact the lateral legs).

In the example of FIG. 3, the first and second vertical brackets 68, 70 are welded to a laterally outer surface of a respective one of the first and second vertical legs 40, 42 and are riveted to the inner body panel 26, and the first and second lateral brackets 72, 74 are welded to a lower surface of a respective one of the first and second lateral legs 46, 48 and are bolted to the outer body panel 24. The first and second lateral brackets 72, 74 help evenly distribute loads placed on the bar 38, and in particular effectively changes a pivot point of the bar 38 such that the bar 38 better resists torque loads.

Figures 5, 6:
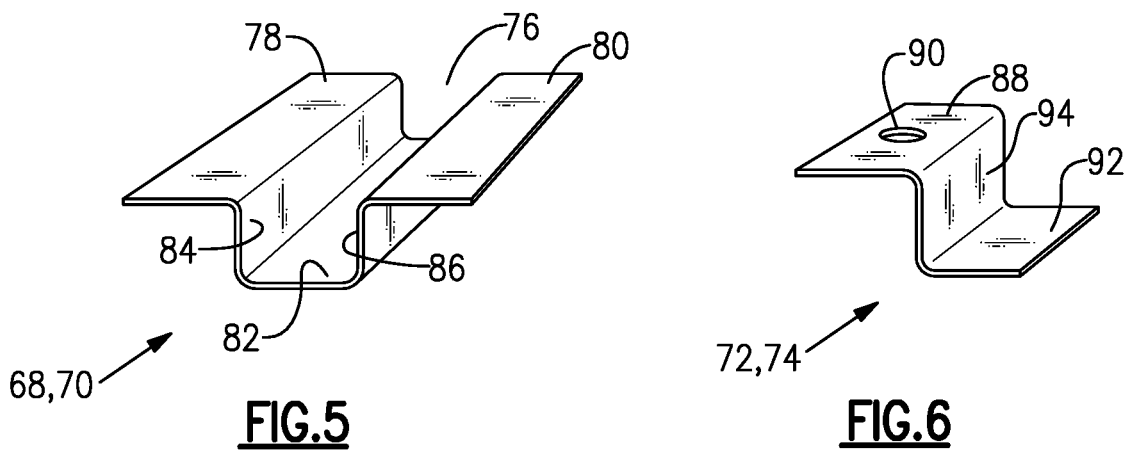
FIG. 5 illustrates an example bracket.
FIG. 6 illustrates another example bracket.

FIG. 5 shows additional detail of a vertical bracket which is representative of the vertical brackets 68, 70. In FIG. 5, the vertical bracket includes a channel 76 configured to receive the respective one of the first and second vertical legs 40, 42. The vertical bracket further includes first and second panel-attachment walls 78, 80 on opposite sides of the channel 76 and configured to directly contact the inner body panel 26. The first and second panel-attachment walls 78, 80 are configured to receive rivets or other fasteners which connect the vertical bracket to the inner body panel 26. The vertical bracket further includes a channel base 82 lying in a plane parallel to the first and second panel-attachment walls 78, 80 and defining a portion of the channel 76. The channel base 82 is welded directly to a laterally outer surface of one of the first and second vertical legs 40, 42 in one example. Finally, first and second channel side walls 84, 86 connect the first and second panel-attachment walls 78, 80 to the channel base 82 and defining opposite sides of the channel 76. The bracket of FIG. 5 is made by bending a single piece of material, in one example.

FIG. 6 shows additional detail of a lateral bracket which is representative of the lateral brackets 72, 74. The lateral bracket of FIG. 6 includes a panel-attachment wall 88 configured to directly contact the outer body panel 24 and including an opening 90 configured to receive a fastener that connects the outer body panel 24 to the panel-attachment wall 88. The lateral bracket further includes a first leg-attachment wall 92 lying in a plane substantially parallel to the panel-attachment wall but below the panel-attachment wall 88. The first leg-attachment wall 92 may be welded to a lower surface of the first and second lateral legs 46, 48 in one example. The lateral bracket further includes second leg-attachment wall 94 extending between the first leg-attachment wall 92 and the panel-attachment wall 88. The second leg-attachment wall 94 may be welded to a front side of the lateral leg 46 or a rear side of the lateral leg 48.

FIGS. 7 and 8 illustrate another dual-purpose component according to this disclosure. In FIGS. 7 and 8, like parts are similar to those described in FIGS. 1-6 and are preappended with a "1." In FIGS. 7 and 8, the dual-purpose component 128 is a plate, such as a reinforcement plate, and includes an opening 196 between a first laterally-outer surface 198 and a second laterally-inner surface 200 on opposite sides of the opening 196. The first laterally-outer surface 198, in this example, includes a downwardly-projecting flange, which is best seen in FIG. 8, which extends into the cutout 130 and the recess 136. The second laterally-inner surface 200 is substantially flat in this example.

The outer body panel 124 is optionally covered with a piece of trim 202 configured to fit on the upper surface 132 and over the dual-purpose component 128. The trim 202 includes a cutout 204 configured to provide access to the dual-purpose component 128. The dual-purpose component 128 reinforces outer body panel 124 and the trim 202. The lateral first laterally-outer surface 198 is substantially smooth and has a contour such that it is configured as a grab handle, and the second laterally-inner surface 200 is configured to attach to a tie-down.

It should be understood that terms such as "about," "substantially," and "generally" are not intended to be boundaryless terms, and should be interpreted consistent with the way one skilled in the art would interpret those terms. Further, directional terms such as "lateral," "below," "above," "front," "rear," "forward," "rearward," "upward," "downward," "vertical," "horizontal," etc., are used with reference to a normal operational attitude of a motor vehicle.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a body panel defining at least a portion of a recess; and
a component rigidly mounted to the body panel such that the component is arranged at least partially in the recess, wherein the component provides a tie-down bracket configured to attach to a tie-down and a grab handle configured to be grasped by a hand of a user.

2. The motor vehicle as recited in claim 1, wherein the component includes a bar.

3. The motor vehicle as recited in claim 2, wherein the bar includes:
a first vertical leg,
a second vertical leg, and
a U-shaped section extending between the first and second vertical legs.

4. The motor vehicle as recited in claim 3, wherein an upper surface of the U-shaped section lies beneath a plane defined by an upper wall of the body panel.

5. The motor vehicle as recited in claim 4, wherein:
the U-shaped section includes first and second lateral legs and a longitudinal leg,
the first and second lateral legs extend in a direction normal to the first and second vertical legs, and
the longitudinal leg extends between the first and second lateral legs in a direction normal to the first and second lateral legs.

6. The motor vehicle as recited in claim 5, wherein:
the first and second lateral legs are connected to respective first and second vertical legs via first and second bends in the bar, and
the longitudinal leg is connected to the first and second lateral legs by respective third and fourth bends in the bar.

7. The motor vehicle as recited in claim 5, wherein:
the body panel is an outer body panel of a box of the motor vehicle, and
the box further comprises an inner body panel defining a portion of the recess.

8. A motor vehicle, comprising:
a body panel defining at least a portion of a recess;
a component mounted at least partially in the recess, wherein the component provides a tie-down bracket configured to attach to a tie-down and a grab handle configured to be grasped by a hand of a user,
wherein the component includes a bar,
wherein the bar includes a first vertical leg, a second vertical leg, and a U-shaped section extending between the first and second vertical legs,
wherein an upper surface of the U-shaped section lies beneath a plane defined by an upper wall of the body panel,
wherein the U-shaped section includes first and second lateral legs and a longitudinal leg,
wherein the first and second lateral legs extend in a direction normal to the first and second vertical legs,
wherein the longitudinal leg extends between the first and second lateral legs in a direction normal to the first and second lateral legs,
wherein the body panel is an outer body panel of a box of the motor vehicle,
wherein the box further comprises an inner body panel defining a portion of the recess,
wherein the motor vehicle further comprises first and second vertical brackets connecting respective first and second vertical legs to the inner body panel, and
wherein the motor vehicle further comprises first and second lateral brackets connecting respective first and second lateral legs to the outer body panel.

9. The motor vehicle as recited in claim 8, wherein:
the first and second vertical brackets are welded to a respective one of the first and second vertical legs and are riveted to the inner body panel, and
the first and second lateral brackets are welded to a respective one of the first and second lateral legs and are bolted to the outer body panel.

10. The motor vehicle as recited in claim 9, wherein:
the first and second vertical brackets are welded at least to a laterally outer surface of the respective one of the first and second vertical legs, and
the first and second lateral brackets are welded at least to a lower surface of the respective one of the first and second lateral legs.

11. The motor vehicle as recited in claim 10, wherein the first and second vertical brackets each include:
a channel,
first and second panel-attachment walls on opposite sides of the channel and configured to directly contact the inner body panel,
a channel base lying in a plane parallel to the first and second panel-attachment walls and defining a portion of the channel, and
first and second channel side walls connecting the first and second panel-attachment walls to the channel base and defining opposite sides of the channel.

12. The motor vehicle as recited in claim 10, wherein the first and second lateral brackets each include:
a panel-attachment wall configured to directly contact the outer body panel,
a first leg-attachment wall lying in a plane substantially parallel to the panel-attachment wall, and
a second leg-attachment wall extending between the first leg-attachment wall and the panel-attachment wall.

13. The motor vehicle as recited in claim 1, wherein the body panel includes a cutout leading into the recess.

14. The motor vehicle as recited in claim 1, wherein:
the component is a reinforcement plate and includes an opening between a first lateral surface and a second lateral surface on opposite sides of the opening,
the first lateral surface is configured as a grab handle, and
the second lateral surface is configured to attach to a tie-down.

15. The motor vehicle as recited in claim 1, further comprising a trim piece arranged over the component, wherein the trim piece includes an opening providing access to the component.

16. The motor vehicle as recited in claim 1, wherein:
the body panel is a panel of a box the motor vehicle, and
the component is one of a plurality of substantially similar components such that one or more tie-downs can be attached to the plurality of components to hold cargo.

17. The motor vehicle as recited in claim 16, wherein the motor vehicle is a pickup truck and the box includes a cargo bed.

18. A motor vehicle assembly, comprising:
a body panel defining at least a portion of a recess;
a bar mounted at least partially in the recess, wherein the bar provides a tie-down bracket configured to attach to a tie-down and a grab handle configured to be grasped by a hand of a user, the bar including a first vertical leg, a second vertical leg, and a U-shaped section including a first lateral leg, a second lateral leg, and a longitudinal section extending between the first and second lateral legs.

19. The motor vehicle assembly as recited in claim 18, wherein:
- the body panel is an outer body panel of a box of the motor vehicle,
- an inner body panel of the box defines a portion of the recess,
- a first set of brackets connects the first and second vertical legs to the inner body panel, and
- a second set of brackets connects the first and second lateral legs to the outer body panel.

20. The motor vehicle assembly as recited in claim 19, wherein the body panel includes a plurality of recesses and a plurality of bars, each of the plurality of bars arranged in a respective one of the plurality of recesses, and wherein each of the bars is configured as a tie-down bracket and a grab handle.

\* \* \* \* \*